No. 879,043. PATENTED FEB. 11, 1908.
R. T. GILLESPIE.
CLEANING BRUSH.
APPLICATION FILED FEB. 11, 1907.
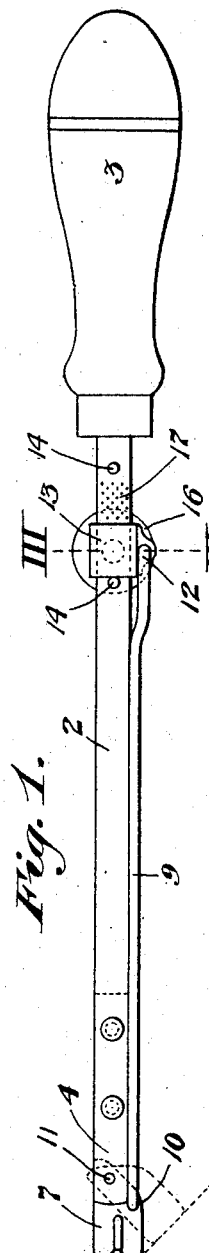
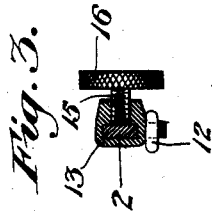
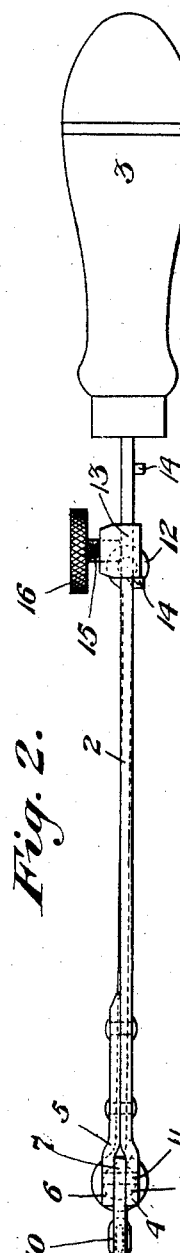
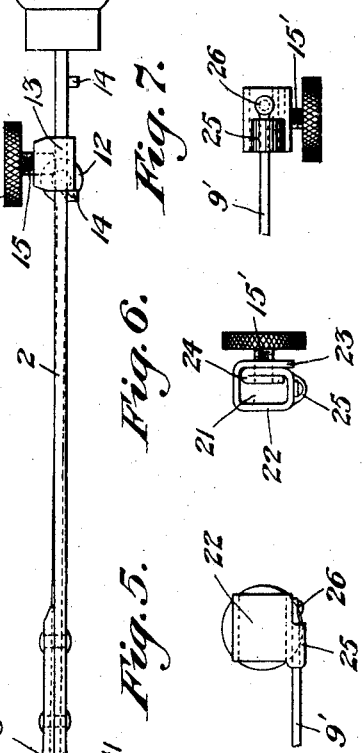
Witnesses:
Chas. S. Lipley
E. R. Rodd
Inventor:
Rob't T. Gillespie
by O. M. Clarke
his Attorney

UNITED STATES PATENT OFFICE.

ROBERT T. GILLESPIE, OF BLOOMFIELD, NEW JERSEY.

CLEANING-BRUSH.

No. 879,043.  Specification of Letters Patent.  Patented Feb. 11, 1908.

Application filed February 11, 1907. Serial No. 356,697.

*To all whom it may concern:*

Be it known that I, ROBERT T. GILLESPIE, a citizen of the United States, residing at Bloomfield, in the county of Essex and State of New Jersey, have invented certain new and useful Improvements in Cleaning-Brushes, of which the following is a specification, reference being had therein to the accompanying drawings.

My invention refers to improvements in cleaning brushes and relates particularly to such a device designed for the purpose of easily cleaning the interior of bottles, cruets, vases, and other similar articles, being capable of adjustment of the brush with relation to the holding handle at any desired angle, in the manner and by the construction hereinafter described.

Referring to the drawings, Figure 1. is a view in side elevation of the complete brush, indicating the adjusted position in dotted lines, the brush being shown in reversed position, to more clearly illustrate the mounting of the adjusting connecting rod and its limiting abutments. Fig. 2. is a plan view of Fig. 1. Fig. 3. is a cross sectional view on the line III. III. of Fig. 1. Fig. 4. is a detail view showing a modified construction of the brush holding and pivoting element, made of twisted wire. Figs. 5, 6 and 7 are detail views showing a modified construction of the sliding block for the connecting rod, and the manner of mounting the adjusting set screw and connecting the adjusting rod with the block.

In the drawings, 2 is the main shank or stem of the device, provided at one end with a holding handle 3 and at the opposite or brush-holding terminal having a bifurcated extremity 4. The bifurcated extremity may be made by attaching to it a supplemental side piece 5 as shown or in any other suitable manner, so as to provide pivoting cheeks 6 between which the rear end of the brush-holding block 7 is pivoted. Said block 7, which may be of any form or construction, is provided with a forwardly extending twisted wire bristle-holding stem 8 as shown, incorporated with the block 7 in any suitable manner, and the brush as thus pivoted is manually manipulated or adjusted by means of a rod 9, pivotally connected to the block at 10 as shown, at one side and preferably forward of its pivotal mounting 11. The rod 9 extends backwardly along the main shank as shown and is pivotally connected at 12 by a terminal eye to a sliding block 13 embracing the main shank and adapted for limited movement along the main shank for adjustment of the brush.

14, 14, are limiting stops in the form of pins or abutments of any convenient form, adapted to arrest the movement of the sliding block 13 in one direction or another, although such pins may be eliminated if desired. The block 13 is preferably thickened at one side as shown to give a good screw bearing and is provided with a securing set screw 15 having a finger terminal 16, the set screw being tapped through the block and adapted to bear against the side of the shank for holding the block and consequently the brush in any position.

One or both sides of the shank 2 are preferably roughened or corrugated as indicated at 17 for the purpose of providing a good bearing for the end of the set screw or for the opposite inner side of the sliding block, so as to insure against movement when once locked.

As thus constructed it will be seen that the brush may be easily and quickly adjusted to any desired position and there set, by merely manipulating the set screw. In order to facilitate quick adjustment for tightening and loosening, the threads of the screw may be made of such degree as will give it a quick lead, although ordinarily a partial turn of the set screw will be ample.

In Fig. 4 I have shown a brush-holding pivotal terminal device consisting of a twisted wire construction, so made as to provide a pivoting eye 18 at the rear end, the adjusting rod-attaching eye 19 at one side of the central portion of the device, and the forwardly extending wires 20, 20, which may be twisted together with the brush bristles in the same manner as is shown in the principal figures of the drawing. The opposite sides of the twisted wires are preferably flattened as by hammering or pressing, to amalgamate the wires together into a solid rigid device and at the same time giving a good flat, smooth finish thereto.

In Figs. 5, 6 and 7 I show a modified construction of the sliding adjustable block, for the connecting rod, made of a band of wrought metal, bent around into rectangular form to embrace the bar 2 within the space 21. In this construction the ends of the strip 22 are overlapped as shown at 23 and soldered or brazed together, thereby securing double thickness of metal for engagement of the threaded set screw, while one of the ends of the metal band, preferably the inner, may be doubled upon itself as shown at 24 to further increase the available thickness and provide stock for cutting the threads. The inner cavity 21 is of a size to slidingly and freely engage the bar, so that as thus made the block will operate in the same manner as does the cast metal block already described, being provided with the set screw 15' and having attached to it the operating rod 9'. The attachment of said rod is shown rigid, being embraced by a projecting lug 25 either forced out from the band or brazed to it, while the end of the rod is riveted to the band as shown at 26, thus providing a strong rigid attachment. Such construction is available for use with the brush as shown, it being understood that the pivotal connection between the operating rod and the sliding block is not absolutely necessary, the rod being capable of a certain amount of spring or deflection to provide for easy movement of the brush and its pivotal connection with the rod. This form of connection may be utilized with other designs or constructions of similar brush such for instance, as that shown in my prior application filed October 26, 1906 bearing the Ser. No. 340,759 and is not intended to be used only with the construction herein shown and described.

The operation of the invention will be readily understood from the foregoing description and it will be found to provide a convenient easily adjusted construction for the purpose, capable of manufacture at small cost, and not liable to get out of order.

Having described my invention, what I claim is—

1. In a cleaning brush, the combination with a main stem having a pivotally mounted brush portion, an operating rod pivotally connected to the brush portion, a sliding box embracing the stem also connected to said rod, and an adjusting set screw mounted in the box and adapted to engage the stem, substantially as set forth.

2. In a device of the class described, the combination with the main stem having a roughened or corrugated surface and a pivotally mounted brush, of a sliding box having a pivotally connected adjusting rod attached at its other end to the brush, and provided with an adjusting set screw adapted to bear upon the roughened surface of the stem, substantially as set forth.

3. In a cleaning brush, the combination with the main shank provided with limiting projections and a pivotally mounted brush portion, of a slidingly mounted adjusting block connected with said brush portion and provided with a securing set screw, substantially as set forth.

4. The combination with the main shank having limiting projections, the sliding adjusting block provided with a set screw, and an adjusting rod, of a brush portion consisting of a bristle-holding and pivoting stem made of a single strand of wire twisted together and provided at its rear end with a pivoting terminal eye hinged to said shank, a laterally arranged eye engaging said adjusting rod, and forwardly extending bristle holding wires spirally twisted together, bristles held thereby, an operating rod pivotally connected to said laterally arranged eye, and means for adjusting and positioning the operating rod to hold the brush stem in varying positions, substantially as set forth.

In testimony whereof I affix my signature in presence of two witnesses.

ROBERT T. GILLESPIE.

Witnesses:
   GUY T. WHITNEY,
   GEO. W. HEATH.